(12) United States Patent
Nakagawa et al.

(10) Patent No.: US 9,663,668 B2
(45) Date of Patent: May 30, 2017

(54) INKJET INK, INKJET RECORDING METHOD AND INK RECORDED MATTER

(71) Applicants: Tomohiro Nakagawa, Kanagawa (JP); Naohiro Toda, Kanagawa (JP); Hidefumi Nagashima, Kanagawa (JP); Ichiroh Fujii, Kanagawa (JP); Juichi Furukawa, Kanagawa (JP)

(72) Inventors: Tomohiro Nakagawa, Kanagawa (JP); Naohiro Toda, Kanagawa (JP); Hidefumi Nagashima, Kanagawa (JP); Ichiroh Fujii, Kanagawa (JP); Juichi Furukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/759,098

(22) PCT Filed: Jan. 27, 2014

(86) PCT No.: PCT/JP2014/052364
§ 371 (c)(1),
(2) Date: Jul. 2, 2015

(87) PCT Pub. No.: WO2014/119769
PCT Pub. Date: Aug. 7, 2014

(65) Prior Publication Data
US 2015/0361282 A1   Dec. 17, 2015

(30) Foreign Application Priority Data

Jan. 30, 2013  (JP) ................... 2013-015461
Mar. 13, 2013  (JP) ................... 2013-049780
Dec. 27, 2013  (JP) ................... 2013-273127

(51) Int. Cl.
*C09D 11/033*  (2014.01)
*C09D 11/322*  (2014.01)
(Continued)

(52) U.S. Cl.
CPC .............. *C09D 11/033* (2013.01); *B41J 2/01* (2013.01); *C09D 11/102* (2013.01);
(Continued)

(58) Field of Classification Search
CPC ........................................................ C09D 11/30
See application file for complete search history.

(56) References Cited

U.S. PATENT DOCUMENTS 8,110,257 B2   2/2012  Nagashima et al.
8,304,043 B2  11/2012  Nagashima et al.
(Continued)

FOREIGN PATENT DOCUMENTS

JP   2005-220352   8/2005
JP   2008-037935   2/2008
(Continued)

OTHER PUBLICATIONS

Machine Translation of JP 2013-001755.*
(Continued)

*Primary Examiner* — Gerard Higgins
*Assistant Examiner* — Sathavaram I Reddy
(74) *Attorney, Agent, or Firm* — Oblon, McClelland, Maier & Neustadt, L.L.P.

(57) ABSTRACT

An inkjet ink, containing: water; a water-soluble organic solvent; a pigment; and polycarbonate urethane resin particles, wherein the water-soluble organic solvent contains 50% by mass or more of a diol compound, and wherein the water-soluble organic solvent contains 50% by mass or more of a water-soluble organic solvent having a boiling point of 200° C. or less.

11 Claims, 2 Drawing Sheets

(51) Int. Cl.
*C09D 11/102* (2014.01)
*B41J 2/01* (2006.01)
*C09D 11/38* (2014.01)

(52) U.S. Cl.
CPC ............ *C09D 11/322* (2013.01); *C09D 11/38* (2013.01); *Y10T 428/24901* (2015.01)

(56) References Cited

U.S. PATENT DOCUMENTS

| | | |
|---|---|---|
| 8,382,271 B2 | 2/2013 | Goto et al. |
| 2003/0144375 A1* | 7/2003 | Wu ........................ C09D 11/40 523/160 |
| 2004/0242726 A1 | 12/2004 | Waki et al. |
| 2005/0176847 A1 | 8/2005 | Cagle |
| 2005/0204955 A1 | 9/2005 | Nagashima et al. |
| 2009/0047431 A1 | 2/2009 | Hatada et al. |
| 2010/0028625 A1 | 2/2010 | Kagata et al. |
| 2011/0205288 A1 | 8/2011 | Matsuyama et al. |
| 2011/0318551 A1 | 12/2011 | Nakagawa |
| 2012/0098883 A1 | 4/2012 | Matsuyama et al. |
| 2012/0188312 A1 | 7/2012 | Nakagawa |
| 2012/0306976 A1 | 12/2012 | Kitagawa et al. |
| 2012/0308785 A1 | 12/2012 | Nakagawa |
| 2013/0002776 A1 | 1/2013 | Nagashima et al. |
| 2013/0023614 A1 | 1/2013 | Hatada et al. |
| 2013/0063524 A1 | 3/2013 | Katoh et al. |
| 2013/0108841 A1* | 5/2013 | Denda .................. C09D 11/102 428/195.1 |
| 2013/0197144 A1 | 8/2013 | Katoh et al. |
| 2013/0271524 A1 | 10/2013 | Katoh et al. |

FOREIGN PATENT DOCUMENTS

| | | |
|---|---|---|
| JP | 2009-215506 | 9/2009 |
| JP | 2010-053328 | 3/2010 |
| JP | 2010-159417 | 7/2010 |
| JP | 2011-094082 | 5/2011 |
| JP | 2011-190406 | 9/2011 |
| JP | 2012-077111 | 4/2012 |
| JP | 2012-077118 | 4/2012 |
| JP | 2013-001755 | 1/2013 |
| JP | 2013-121994 | 6/2013 |
| JP | 2013-144730 | 7/2013 |
| JP | 2014-159533 | 9/2014 |
| RU | 2 361 896 | 7/2009 |

OTHER PUBLICATIONS

Extended European Search Report issued Nov. 13, 2015 in Patent Application No. 14746294.9.
International Search Report Issued Apr. 22, 2014 in PCT/JP2014/052364 filed Jan. 27, 2014.
Office Action issued Dec. 20, 2016, in Russian Patent Application No. 2015136599 with English Translation.

* cited by examiner

INKJET INK, INKJET RECORDING METHOD AND INK RECORDED MATTER

TECHNICAL FIELD

The present invention relates to an inkjet ink which is the most suitable for recording onto a base, an inkjet recording method, and an ink recorded matter.

BACKGROUND ART

Inkjet printers have advantages of low-noise, low-running cost, easiness of color printing, so that they have been widely spread in common households as an output apparatus of digital signal.

In recent years, the inkjet printers have been used for industrial use such as a display, a poster, or a bulletin board, as well as for home use. However, in the case of industrial use, a non-porous recording medium such as a plastic film has been used, because a porous recording medium has a disadvantage in durability such as light resistance, water resistance, or wear resistance. Therefore, an ink for the non-porous recording medium has been developed. For example, a solvent based inkjet ink which contains an organic solvent as a vehicle and a UV curable inkjet ink which contains a polymerizable monomer as a main ingredient have been widely used.

However, the solvent based inkjet ink is not preferable from the viewpoint of environmental loads, because it vaporizes a large amount of the solvent therein into the atmosphere. The UV curable inkjet ink may have skin sensitization depending on a type of the monomer to be used. Additionally, an expensive ultraviolet irradiation device should be integrated into a main body of a printer, which limits a field of application of the ink.

In view of the above described background, recently, an aqueous inkjet recording ink has been developed which can directly printed onto a non-porous base (see PTLs 1 and 2).

However, it has been mentioned that the aqueous ink is in some ways inferior to the solvent based inkjet ink with respect to image quality.

Firstly, the non-porous base such as the plastic film easily repels water which is a main ingredient of the aqueous ink, so that ink droplets ejected from a head do not easily wet and spread over the base. As a result, microvoids are left on a solid image, and high image density is difficult to be achieved.

Secondly, the ink basically does not penetrate into the non-porous base. Therefore, the ink ejected onto the base must rapidly dry. However, water serving as a main solvent of the aqueous ink, and a water-soluble organic solvent serving as an additive deteriorate a drying property of the ink, which tends to cause drying failure. Accordingly, set-off of the ink, so-called blocking, may occur when a printed matter is placed on top of another or is rolled up.

Further, the non-porous base often has high glossiness. Therefore, in order to prevent integrity as a recorded matter from being impaired between a printed portion and a non-printed portion upon printing, an ink which can achieve high glossiness has been demanded. However, in the case of aqueous ink, unlike the solvent based ink in which resin is dissolved into the ink, particles are fused to each other to thereby form a coating film, so that a surface thereof tends to be roughened and glossiness tends to be impaired.

Additionally, with respect to image fastness, satisfactory scratch resistance and ethanol resistance have not been achieved. Therefore, the fact is that an aqueous ink having higher performance is demanded.

Meanwhile, an aqueous inkjet ink containing polycarbonate urethane resin particles has been already known before the filing of the patent application (see PTLs 3 and 4). However, an ink composition for the non-porous base has not been examined. There have been examinations only on conventional pigment inks.

CITATION LIST

Patent Literature

PTL 1 Japanese Patent Application Laid-Open (JP-A) No. 2005-220352
PTL 2 JP-A No. 2011-094082
PTL 3 JP-A No. 2010-053328
PTL 4 JP-A No. 2012-077118

SUMMARY OF INVENTION

Technical Problem

An object of the present invention is to provide an inkjet ink of which droplets wet and spread over a base without leaving any voids, which can achieve high image density and glossiness, which exhibits an excellent drying property, and which achieves high scratch resistance, ethanol resistance, and adhesive property on a printed portion when the ink is printed on the base.

Solution to Problem

A means for solving the aforementioned problems is as follows:
An inkjet ink, containing:
water;
a water-soluble organic solvent;
a pigment; and
polycarbonate urethane resin particles,
wherein the water-soluble organic solvent contains 50% by mass or more of a diol compound, and wherein the water-soluble organic solvent contains 50% by mass or more of a water-soluble organic solvent having a boiling point of 200° C. or less.

Advantageous Effects of Invention

The present invention can solve the above existing problems, achieve the above object, and provide an inkjet ink of which droplets wet and spread over a base without leaving any voids, which can achieve high image density and glossiness, which exhibits an excellent drying property, and which achieves high scratch resistance, ethanol resistance, and adhesive property on a printed portion when the ink is printed on the base.

In particular, the inkjet ink of the present invention can provide an image having excellent glossiness and image fastness when applied onto a non-porous base such as a plastic film.

DESCRIPTION OF EMBODIMENTS (Inkjet Ink)

An inkjet ink of the present invention (hereinafter may be referred to as an "ink") contains at least water, a water-soluble organic solvent, a pigment, and polycarbonate urethane resin particles; and, if necessary, further contains other ingredients.

The inkjet ink contains a water-soluble organic solvent in order to prevent the ink from drying at a nozzle surface and to ensure wettability of the ink on a recording medium. Generally, a water-soluble organic solvent has a higher boiling point than water, so that the water-soluble organic solvent does not easily dry. Accordingly, a water-soluble organic solvent having a relatively low boiling point should be used in order to achieve a drying property required in the present invention. However, when an organic solvent dries quickly, in general, resin particles prematurely form a film. As a result, a sufficiently uniform coating film cannot be formed, and the coating film is deteriorated in film strength and glossiness.

Therefore, the present inventors have examined a relationship between resin emulsion and a water-soluble organic solvent, and have found that polycarbonate urethane resin particles allow a uniform film to be formed. Additionally, they have found that 50% by mass or more of the water-soluble organic solvent contained in the ink should be a diol compound; and 50% by mass or more, preferably 70% by mass to 90% by mass of the water-soluble organic solvent should be a water-soluble organic solvent having a boiling point of 200° C. or less. When a content rate of the diol compound or the water-soluble organic solvent having a boiling point of 200° C. or less is less than 50% by mass, the resulting ink has a low drying property, so that it cannot form a satisfactory coating film and blocking is caused.

<Polycarbonate Urethane Resin Particles>

The polycarbonate urethane resin is excellent in water resistance, heat resistance, wear resistance, and weather resistance due to high cohesion of a carbonate group, so that it is suitable for printed matter used in a harsh environment such as outdoor. The polycarbonate urethane resin, as used herein, refers to a reaction product of polycarbonate polyol and polyisocyanate.

As the polycarbonate polyol, for example, those obtained through an ester exchange reaction between ester carbonate and polyol in the presence of a catalyst or those obtained through a reaction between phosgene and bisphenol A can be used.

As the carbonate ester, for example, methyl carbonate, dimethyl carbonate, ethyl carbonate, diethyl carbonate, cyclocarbonate, or diphenyl carbonate can be used. As the polyol to be react with the carbonate ester, for example, low molecular diol compounds such as ethylene glycol, diethylene glycol, 1,2-propylene glycol, dipropylene glycol, 1,4-butanediol, 1,5-pentanediol, 3-methyl-1,5-pentanediol, neopentyl glycol, and 1,4-cyclohexanediol; polyethylene glycol; or polypropylene glycol can be used.

The polyisocyanate is not particularly limited. Examples thereof include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate, and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate and 2-isocyanatoethyl-2,6-diisocyanatohexanoate; isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate and 2,6-norbornane diisocyanate. These may be used alone or in combination.

An ink of the present invention aims to be used for outdoor use such as a poster or a signage, so that it needs to form a coating film having excellent weather resistance over a long period of time. From this viewpoint, aliphatic or alicyclic diisocyanates are preferably used.

Additionally, an ink of the present invention preferably contains at least one alicyclic diisocyanate. In the case where the polycarbonate urethane resin particles have structures derived from an alicyclic diisocyanate, the resulting ink is further improved in scratch resistance and ethanol resistance. Isophorone diisocyanate and dicyclohexylmethane diisocyanate are particularly preferable. A content rate of the alicyclic diisocyanate is preferably 60% by mass or more relative to the total content of isocyanate compounds.

In an ink of the present invention, polycarbonate urethane resin particles are added in the form of resin emulsion in which polycarbonate urethane resin particles are dispersed into an aqueous medium. The solid content of resin in the resin emulsion is preferably 20% by mass or more. When the solid content is 20% by mass or more, there is no problem in formulation of the resulting ink. The volume average particle diameter of the urethane resin particles is preferably 10 nm to 350 nm from the viewpoints of storage stability and ejection stability of the resulting ink.

Upon dispersing the urethane resin particles into the aqueous medium, forced emulsification utilizing a dispersing agent may be used. In the case of forced emulsification, however, the dispersing agent may remain on a coating film to thereby decrease strength thereof. Therefore, self-emulsifying urethane resin particles which have anionic groups in their molecular structure are preferably used. In the case where the self-emulsifying urethane resin particles are used, it is preferable that the anionic groups are contained so that the acid value thereof is 20 mgKOH/g to 100 mgKOH/g, from the viewpoint of imparting excellent scratch resistance and chemical resistance.

Examples of the anionic groups include a carboxyl group, a carboxylate group, a sulfonic group, and a sulfonate group. Among them, a carboxylate group and a sulfonate group partially or totally neutralized with, for example, a basic compound are preferable from the viewpoint of maintaining good water-dispersion stability. Examples of the basic compound which can be used for neutralizing the anionic group include organic amines such as ammonia, triethyl amine, pyridine, and morpholine; alkanol amines such as monoethanolamine; and metallic base compounds containing Na, K, Li, or Ca.

In the case of forced emulsification utilizing the dispersing agent, a nonionic surfactant and an anionic surfactant may be used as the dispersing agent. However, a nonionic surfactant is preferable from the viewpoint of good water resistance.

Examples of the nonionic surfactant include polyoxyethylene alkyl ether, polyoxyethylene alkylene alkyl ether, polyoxyethylene derivative, polyoxyethylene fatty acid ester, polyoxyethylene polyhydric alcohol fatty acid ester, polyoxyethylene propylene polyol, polyoxyethylene sorbitan fatty acid ester, polyoxyethylene hydrogenated castor oil, polyoxyalkylene polycyclic phenyl ether, polyoxyethylene alkylamine, alkylalkanolamide, and polyalkylene glycol (meth)acrylate. Among them, preferable are polyoxyethylene alkylether, polyoxyethylene fatty acid ester, polyoxyethylene sorbitan fatty acid ester, and polyoxyethylene alkylamine.

Examples of the anionic surfactant include alkyl sulfuric acid ester salt, polyoxyethylene alkylether sulfate, alkyl benzene sulfonate, α-olefin sulfonate, methyl taurate, sulfosuccinate, ether sulfonate, ether carbonate, fatty acid salt, naphthalene sulfonate formalin condensate, alkyl amine salt, quaternary ammonium salt, alkyl betaine, and alkyl amine oxide. Among them, preferable are polyoxyethylene alkylether sulfate and sulfosuccinate.

An amount of the surfactant added is preferably 0.1% by mass to 30% by mass, more preferably 5% by mass to 20% by mass, relative to that of the urethane resin. When the amount is 0.1% by mass or more, the surfactant can act as a dispersing agent. Meanwhile, use of the surfactant in amount of more than 30% by mass is not preferable, because an excessive amount, i.e., an amount more than required to form urethane resin emulsion, of emulsifying agent significantly deteriorates adherability and water resistance. In addition, plasticization or breading is caused upon drying a coating film, so that blocking tends to occur.

Polycarbonate urethane resin particles used in the present invention can be obtained through conventionally known production methods. One example thereof includes the following method.

Specifically, in the absence of a solvent or in the presence of an organic solvent, the polycarbonate polyol is allowed to react with the polyisocyanate in an equivalent ratio so that isocyanate groups are excessively present, to thereby produce an isocyanate-terminated urethane prepolymer. Then, anionic groups in the isocyanate-terminated urethane prepolymer are optionally neutralized with the neutralizing agent, allowed to react with a chain extender, and, finally, optionally remove the organic solvent in a system.

Examples of usable organic solvents include ketones such as acetone and methyl ethyl ketone; ethers such as tetrahydrofuran and dioxane; ester acetates such as ethyl acetate and butyl acetate; nitriles such as acetonitrile; and amides such as dimethyl formamide, N-methylpyrrolidone, and N-ethylpyrrolidone. These may be used alone or in combination.

As the chain extender, polyamines or other active hydrogen atom-containing compounds can be used.

Examples of the polyamines include diamines such as ethylene diamine, 1,2-propane diamine, 1,6-hexamethylene diamine, piperazine, 2,5-dimethyl piperazine, isophorone diamine, 4,4'-dicyclohexylmethane diamine, and 1,4-cyclohexane diamine; polyamines such as diethylene triamine, dipropylene triamine and triethylene tetramine; hydrazines such as hydrazine, N,N'-dimethyl hydrazine, 1,6-hexamethylene bishydrazine; dihydrazides such as succinic dihydrazide, adipic dihydrazide, glutaric dihydrazide, sebacic dihydrazide and isophthalic dihydrazide.

Examples of the other active hydrogen atom-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerol and sorbitol; phenols such as bisphenol A, 4,4'-dihydroxy diphenyl, 4,4'-dihydroxydiphenyl ether, 4,4'-dihydroxydiphenyl sulfone, hydrogenated bisphenol A, and hydroquinone; and water. These may be used alone or in combination, as long as an ink of the present invention is not deteriorated in storage stability.

An ink of the present invention contain polycarbonate urethane resin particles having high heat resistance, so that adhesiveness thereof can be improved by decreasing a residual solvent through heat-drying after printing.

The minimum film forming temperature of the polycarbonate urethane resin particles may not be necessarily a temperature equal to or lower than room temperature. However, in the case where the heat-drying is performed after printing, the minimum film forming temperature is preferably at least a temperature equal to or lower than a temperature at which the ink is heated after printing, and particularly preferably a temperature sufficiently lower than the temperature at which the ink is heated. For example, when the ink is heated at 60° C., the minimum film forming temperature of the resin is preferably 0° C. to 55° C., more preferably 25° C. to 55° C.

Generally, the lower the minimum film forming temperature is, the better a film forming property is. However, when the minimum film forming temperature is too low, the glass transition temperature of the resin is also lowered, leading to unsatisfactory coating film strength.

Note that, the minimum film forming temperature refers to a temperature at which a continuous transparent film is formed when resin emulsion is casted onto a metal plate such as aluminium, followed by heating. In a temperature range which is lower than the minimum film forming temperature, the resin emulsion is in the form of white powder.

The polycarbonate urethane resin particles used in the present invention preferably have a surface hardness at the time when a coating film is formed of 100 N/mm$^2$ or more, more preferably 120 N/mm$^2$ to 180 N/mm$^2$. The surface hardness falling within the above-described range allows the ink to form a tough coating film, leading to higher scratch resistance.

The surface hardness can be measured as follows.

The polycarbonate urethane resin emulsion is applied onto a glass slide so as to have a film thickness of 10 μm, followed by drying at 100° C. for 30 min to thereby form a resin film. The resultant resin film is measured for an indentation depth at the time when a Berkovich indenter is indented with a load of 9.8 mN by means of a micro surface hardness meter (FISCHERSCOPE HM2000, product of Fischer Instruments K.K.), and converted into a Martens hardness according to ISO14577-2002.

An amount of the polycarbonate urethane resin particles added to the ink is preferably 0.5% by mass to 10% by mass, more preferably 1% by mass to 8% by mass, further preferably 3% by mass to 8% by mass on a solid content basis. When the amount is 0.5% by mass or more, a coating film is sufficiently formed onto a pigment, leading to image fastness required. When the amount is 10% by mass or less, the resulting ink is not difficult to be ejected due to too high viscosity.

The polycarbonate urethane resin particles are added in the form of resin emulsion together with other ink materials.

The resin emulsion may contain, for example, a water-soluble organic solvent, an antiseptic agent, a leveling agent, an antioxidant, a photostabilizer, and a UV absorber, if necessary.

The ink of the present invention may contain resin particles other than the polycarbonate urethane resin particles. Examples of the resin particles other than the polycarbonate urethane resin particles include acrylic resin particles, polyolefin resin particles, vinyl acetate resin particles, vinyl chloride resin particles, fluororesin particles, polyether resin particles, and polyester resin particles.

<Water-Soluble Organic Solvent>

A water-soluble organic solvent used in the present invention should contain 50% by mass or more of a diol compound. The "diol compound", as used herein, refers to a compound having two OH groups in its chemical structure. The diol compound has higher moisture retentivity than a compound having no or only one OH group, therefore, significantly contributes to ejection reliability of the resulting ink.

A compound having three or more OH groups has too high intermolecular force, so that it often has an extremely high boiling point and significantly impairs a drying property of the resulting ink.

Examples of the diol compound include ethylene glycol (bp: 196° C.), propylene glycol (bp: 188° C.), 1,2-butanediol (bp: 194° C.), 2,3-butanediol (bp: 183° C.), 2-methyl-2,4-pentanediol (bp: 198° C.), diethylene glycol (bp: 244° C.), triethylene glycol (bp: 287° C.), dipropylene glycol (bp: 230° C.), 1,3-propanediol (bp: 214° C.), 1,3-butanediol (bp: 203° C.), 1,4-butanediol (bp: 230° C.), 2,2-dimethyl-1,3-propanediol (bp: 208° C.), 2-methyl-1,3-propanediol (bp: 213° C.), 1,2-pentanediol (bp: 206° C.), 2,4-pentanediol (bp: 201° C.), 1,5-pentanediol (bp: 242° C.), 1,6-hexanediol (bp: 250° C.), 2-ethyl-1,3-hexanediol (bp: 243° C.), 1,2-hexanediol (bp: 224° C.), and 2,5-hexanediol (bp: 217° C.). These may be used alone or in combination.

Fifty percent by mass or more of a water-soluble organic solvent used in the present invention should have a boiling point of 200° C. or less. Examples thereof include ethylene glycol (bp: 196° C.), propylene glycol (bp: 188° C.), 1,2-butanediol (bp: 194° C.), 2,3-butanediol (bp: 183° C.), 2-methyl-2,4-pentanediol (bp: 198° C.), dipropylene glycol monomethyl ether (bp: 190° C.), propylene glycol-n-butyl ether (bp: 171° C.), propylene glycol-t-butyl ether (bp: 153° C.), diethylene glycol methyl ether (bp: 194° C.), ethylene glycol-n-propyl ether (bp: 150° C.), and ethylene glycol-n-butyl ether (bp: 171° C.). These may be used alone or in combination.

Use of the water-soluble organic solvent allows for an ink having a high drying property on a non-porous base.

Propylene glycol, 2,3-butanediol, or any combination thereof is preferably used as the water-soluble organic solvent having a boiling point of 200° C. or less, because it is compatible with the polycarbonate urethane resin particles and it can achieve an ink having a better film forming property. Thus, the above preferable water-soluble organic solvents improve a coating film in glossiness.

For the purpose of controlling physical properties of the resulting ink, preventing the ink from drying, and improving the ink in dissolution stability, a water-soluble organic solvent other than the water-soluble organic solvent having a boiling point of 200° C. or less may be added, if necessary.

Examples thereof include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol, and 2,5-hexanediol; polyhydric alcohol alkylethers such as dipropylene glycol-n-propyl ether, tripropylene glycol methyl ether, tripropylene glycol-n-propyl ether, propylene glycol phenyl ether, triethylene glycol methyl ether, triethylene glycol methyl ether, triethylene glycol ethyl ether, diethylene glycol-n-hexyl ether, and ethylene glycol phenyl ether; nitrogen-containing heterocyclic compounds such as 2-pyrrolidone, N-methyl pyrrolidinone, and 1-ethyl-2-pyrrolidone; oxetane compounds such as 3-ethyl-3-hydroxymethyl oxetane.

Among them, addition of at least one selected from the group consisting of 3-ethyl-3-hydroxymethyl oxetane, tripropylene glycol monomethyl ether, and a water-soluble organic solvent containing a lactam structure and having a boiling point of 200° C. or more allows to achieve excellent properties such as image glossiness, scratch resistance, and ethanol resistance, in particular, on a non-porous base. Further, when 1-ethyl-2-pyrrolidone is added as the water-soluble organic solvent containing a lactam structure and having a boiling point of 200° C. or more, excellent image quality can be achieved.

Note that, an ink containing no water-soluble organic solvent having a boiling point of more than 250° C. is further improved in a drying property, which is effective.

<Pigment>

As the pigment, an inorganic pigment or an organic pigment may be used.

Examples of the inorganic pigment include titanium oxide, iron oxide, calcium carbonate, barium sulfate, aluminum hydroxide, barium yellow, cadmium red, chrome yellow, and carbon black produced by a known method such as a contact method, furnace method and thermal method.

Examples of the organic pigment include an azo pigment (e.g., azo lake, an insoluble azo pigment, a condensed azo pigment, and a chelate azo pigment), a polycyclic pigment (e.g., a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment), a dye chelate (e.g., a basic dye chelate, and an acidic dye chelate), a nitro pigment, a nitroso pigment, and aniline black.

Among the above pigments, those having good affinity with a solvent are preferably used.

Specific examples of preferable pigments for black include carbon blacks (C. I. Pigment Black 7) such as furnace black, lamp black, acetylene black, and channel black; metals such as copper, iron (C. I. Pigment Black 11); metal compounds such as titanium oxide; and organic pigments such as aniline black (C. I. Pigment Black 1).

Examples of pigments for colors include: C. I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C. I. Pigment Orange 5, 13, 16, 17, 36, 43, and 51; C. I. Pigment Red 1, 2, 3, 5, 17, 22, 23, 31, 38, 48:2, 48:2 [Permanent Red 2B (Ca)], 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (Rhodamine Lake), 3, 5:1, 16, 19, 23, and 38; C. I. Pigment Blue 1, 2, 15 (Phthalocyanine blue), 15:1, 15:2, 15:3 (Phthalocyanine blue), 16, 17:1, 56, 60, and 63; and C. I. Pigment Green 1, 4, 7, 8, 10, 17, 18, and 36.

Besides, a self-dispersible pigment which is made dispersible in water through addition of a functional group such as a sulfone group or a carboxyl group onto a surface of a pigment (e.g., carbon) can be used.

Those which have been made dispersible in water by encapsulating a pigment into a microcapsule, that is, resin particles containing pigment particles can also be used. In this case, all of pigments incorporated in an ink is not necessarily encapsulated into or adsorbed onto resin particles. The pigments may be dispersed in the ink as long as effects of the present invention are not impaired.

A particle diameter of the pigment is not particularly limited and may be appropriately selected depending on the intended purpose, but is preferably 20 nm to 150 nm in terms of the maximum frequency on the maximum number basis. When the particle diameter is more than 150 nm, the resulting ink is deteriorated in pigment dispersion stability, ejection stability, and image quality such as image density, which is not preferable. It is economically difficult to finely disperse the pigment so as to have the particle diameter of less than 20 nm, because dispersion operation or classification operation is complex.

In the case where the pigment is allowed to be dispersed utilizing a dispersing agent, appropriately selected conventionally known pigments can be used. Examples thereof include a polymer dispersing agent and a water-soluble surfactant.

An amount of the pigment added into an ink is preferably about 0.1% by mass to about 10% by mass, more preferably 1% by mass to 10% by mass. Generally, as a pigment is increased in concentration, image density is increased to thereby improve image quality. Meanwhile, reliability such as fixability, ejection stability, and clogging tends to be adversely affected.

<Water>

In an inkjet ink of the present invention, pure water such as ion-exchanged water, ultrafiltrated water, Milli-Q water, and distilled water, or ultrapure water can be used.

<Other Ingredients>

An ink of the present invention may, if necessary, contain other ingredients such as a surfactant, an antiseptic-antifungal agent, an anti-rust agent, or a pH regulator, in addition to the water, the water-soluble organic solvent, the pigment, and the polycarbonate urethane resin particles described above.

<<Surfactant>>

The surfactant is added for the purpose of ensuring wettability onto a recording medium. An amount of the surfactant added into an ink is preferably 0.1% by mass to 5% by mass. When the amount is less than 0.1% by mass, the resulting ink has unsatisfactory wettability onto a base, leading to deteriorated image quality. When the amount is more than 5% by mass, the resulting ink may not be ejected in some cases due to a high foaming property.

The type of the surfactant is not particularly limited, and any of an ampholytic surfactant, a nonionic surfactant, and an anionic surfactant may be used. However, preferably used are nonionic surfactants such as polyoxyethylene alkyl phenyl ether, polyoxyethylene alkyl ester, polyoxyethylene alkyl amine, polyoxyethylene alkyl amide, polyoxyethylene propylene block polymer, sorbitan fatty acid ester, polyoxyethylene sorbitan fatty acid ester, ethylene oxide adducts of acetylene alcohol; and silicone surfactants, in view of a balance between dispersion stability of a colorant and image quality.

The silicone surfactant is not particularly limited and may be appropriately selected depending on the intended purpose. In particular, those which are not decomposed even at a high pH are preferable. Examples thereof include side-chain modified polydimethylsiloxane, both ends-modified polydimethylsiloxane, one end-modified polydimethylsiloxane, and side chain and both ends-modified polydimethylsiloxane. Among them, particularly preferable are those having a polyoxyethylene group or a polyoxyethylene polyoxypropylene group as a group to be modified, because they exhibit excellent properties as an aqueous surfactant. As the silicone surfactant, a polyether-modified silicone surfactant can be used. Example thereof includes a compound in which a polyalkylene oxide structure is introduced into a side chain of a Si site in dimethyl siloxane.

Other surfactants may be used in combination with the silicone surfactant.

Example of the other surfactant includes a fluorosurfactant.

Particularly preferable examples of the fluorosurfactant include a perfluoroalkyl sulfonic acid compound, a perfluoroalkyl carboxylic acid compound, a perfluoroalkyl phosphate ester compound, a perfluoroalkyl ethylene oxide adduct, and a polyoxyalkylene ether polymer compound containing a perfluoroalkyl ether group in its side chain, because of low foaming property.

Examples of the perfluoroalkyl sulfonic acid compound include perfluoroalkyl sulfonic acid, and perfluoroalkyl sulfonate. Examples of the perfluoroalkyl carboxylic acid compound include perfluoroalkyl carboxylic acid, and perfluoroalkyl carboxylate. Examples of the polyoxyalkylene ether polymer compound containing a perfluoroalkyl ether group in its side chain include polyoxyalkylene ether polymer sulfate ester salt containing a perfluoroalkyl ether group in its side chain and polyoxyalkylene ether polymer salt containing a perfluoroalkyl ether group in its side chain. Examples of a counter ion of a salt in the above fluorosurfactants include Li, Na, K, $NH_4$, $NH_3CH_2CH_2OH$, $NH_2(CH_2CH_2OH)_2$, and $NH(CH_2CH_2OH)_3$.

<<Antiseptic-Antifungal Agent>>

Examples of the antiseptic-antifungal agent include 1,2-benzisothiazoline-3-on, sodium benzoate, sodium dehydroacetate, sodium sorbate, sodium pentachlorophenol, and sodium 2-pyridinethiol-1-oxide.

<<Anti-Rust Agent>>

Examples of the anti-rust agent include acidic sulfite, sodium thiosulfate, ammonium thiodiglycolate, diisopropyl ammonium nitrate, pentaerythritol tetranitrate, and dicyclohexyl ammonium nitrate.

<<pH Regulator>>

The pH regulator may be any substance, as long as it does not adversely affect an ink to be prepared, and can adjust pH of the ink to a desired value. Examples of the pH regulator include hydroxides of alkali metal elements (e.g., lithium hydroxide, sodium hydroxide, and potassium hydroxide), carbonates of alkali metals (e.g., lithium carbonate, sodium carbonate, and potassium carbonate), quaternary ammonium hydroxide, amines (e.g., diethanolamine, and triethanolamine), ammonium hydroxide, and quaternary phosphonium hydroxide.

An ink of the present invention is produced by dissolving water, a water-soluble organic solvent, a pigment, polycarbonate urethane resin particles, and, if necessary, other ingredients into an aqueous medium; and optionally stirring and mixing. The stirring and mixing can be performed by means of a stirrer equipped with a conventional impeller, a magnetic stirrer, or a high-speed disperser.

(Inkjet Recording Method)

An inkjet recording method of the present invention includes at least an ink jetting step which is a step of applying a stimulus (energy) to the inkjet ink of the present invention to allow the inkjet ink to jet, to thereby form an image on a base; and, if necessary, may further include other steps.

Note that, the case where paper is used as the base will be described, but other porous bases or non-porous bases can also be used for recording.

Known various inkjet recording methods can be applied to the ink jetting step. For example, a head-scanning type inkjet recording method, or an inkjet recording method in which an image is recorded on a certain sheet-shaped printing paper using aligned heads can be used.

A recording head is generally used as an ink jetting unit in the ink jetting step. A driving system of the recording head is not particularly limited, and may be an on-demand type head utilizing a piezoelectric element actuator using PZT, a system for functioning thermal energy, or an actuator using electrostatic force; or a continuous jetting type charge-controllable head.

An inkjet recording method of the present invention preferably include a heat-drying step which is a step of heat-drying a recording medium after printing, in order to form an image having higher image quality, scratch resistance, and adhesiveness, and to respond to high-speed printing conditions. A hearing device used in the heat-drying step may be appropriately selected from known devices. Example thereof includes a device for forced-air heating, radiation heating, conduction heating, high-frequency drying, or microwave drying. These may be used alone or in combination.

A heating temperature can vary depending on a type and amount of a water-soluble organic solvent contained in an ink, and the minimum film forming temperature of polycarbonate urethane resin emulsion to be added, as well as a type of a base to be printed. The heating temperature is preferably high from the viewpoints of a drying property and a film forming temperature. However, excessively high heating temperature is not preferable, because there are possibilities that the base to be printed is damaged and the ink is not ejected due to an increase of an ink head temperature.

<Inkjet Recording Device>

An inkjet recording device of the present invention includes at least an ink jetting unit configured to apply a stimulus (energy) to the inkjet ink of the present invention to allow the inkjet ink to jet, to thereby form an image on a base; and further includes a heating unit, and, if necessary, other units.

An inkjet recording device which can perform recording using an inkjet ink of the present invention will be described with reference to figures.

Figure 1:
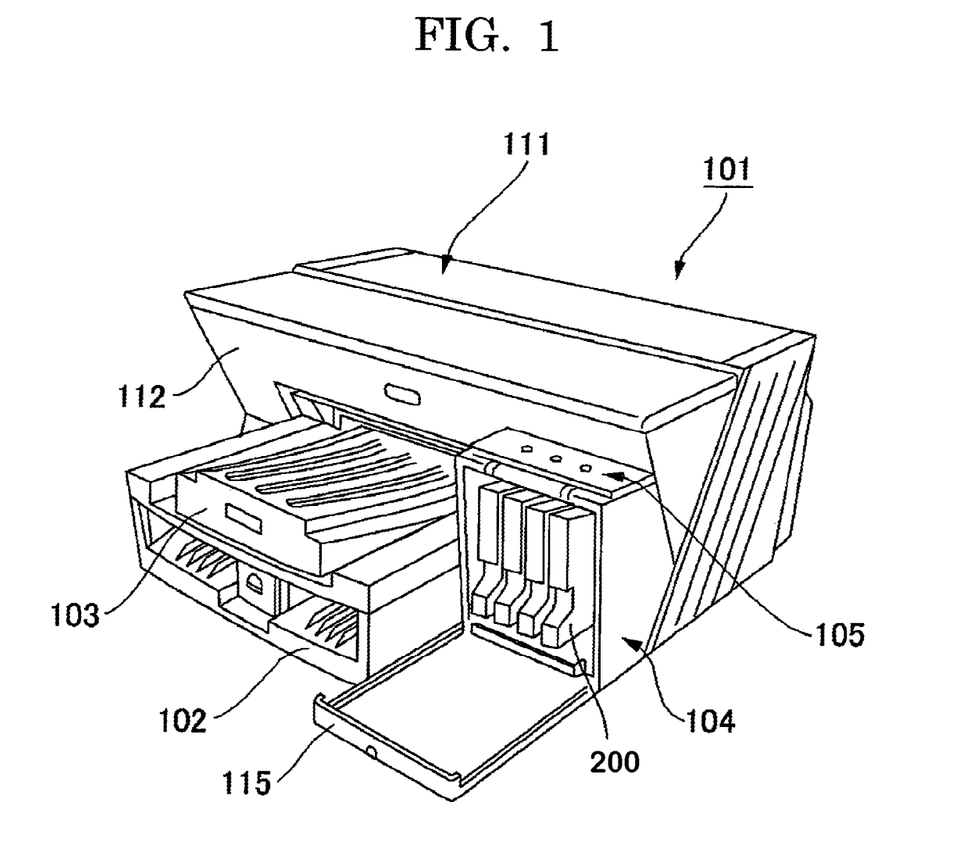
FIG. 1 is a schematic diagram illustrating one example of a serial type inkjet recording device.

Note that, the case where paper is used as the base will be described, but other porous bases or non-porous bases can also be used for recording. The inkjet recording device includes a serial type (shuttle type) inkjet recording device in which carriage is used for scanning, and a line type inkjet recording device which contain a line type head. FIG. 1 is a schematic diagram illustrating one example of a serial type inkjet recording device.

This inkjet recording device contains a device main body 101, a paper feeding tray 102 provided in the device main body 101, a paper discharging tray 103, and an ink cartridge loading section 104. On an upper surface of the ink cartridge loading section 104, a control section 105 such as operation keys and a display is provided. The ink cartridge loading section 104 has a front cover 115 that can be opened and closed for attaching or detaching an ink cartridge 200. The reference numeral 111 denotes a head cover, and 112 denotes a front surface of the front cover.

Figure 2:
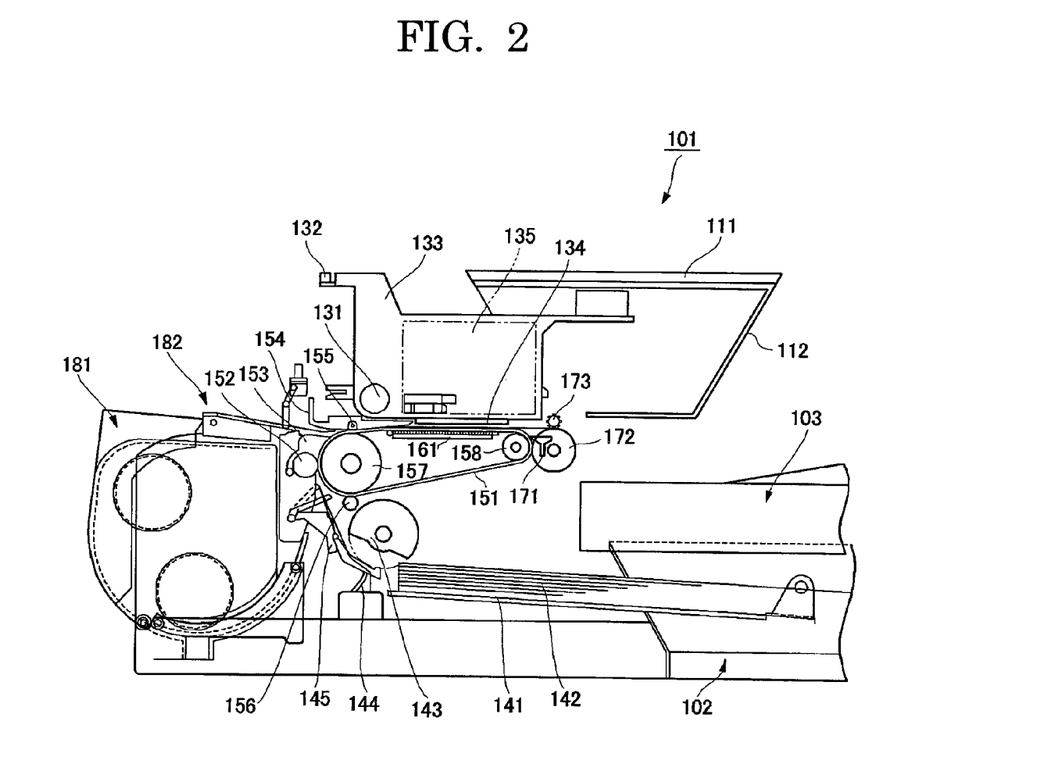
FIG. 2 is a schematic diagram illustrating one example of a configuration in a main body of the inkjet recording device illustrated in FIG. 1.

In the device main body 101, as illustrated in FIG. 2, a carriage 133 is slidably held in a main-scanning direction by a guide rod 131, which is a guide member horizontally bridged between left and right side plates (not shown), and a stay 132; and is moved for scanning by a main scanning motor (not shown).

A recording head 134 composed of four inkjet recording heads configured to eject ink droplets of yellow (Y), cyan (C), magenta (M) and black (Bk) is installed in the carriage 133 such that a plurality of ink ejection outlets are aligned in the direction intersecting the main-scanning direction and that the ink droplet ejection direction faces downward.

For each of the inkjet recording heads composing the recording head 134, it is possible to use, for example, a head provided with any of the following energy-generating units for ejecting ink: a piezoelectric actuator such as a piezoelectric element, a thermal actuator that uses a thermoelectric transducer such as a heat element and utilizes phase change caused by film boiling of a liquid, a shape memory alloy actuator that utilizes a metal phase change caused by a temperature change, and an electrostatic actuator that utilizes electrostatic force.

Also, the carriage 133 is provided with sub-tanks 135 for each color configured to supply each color ink to the recording head 134. Each sub-tank 135 is supplied and replenished with the recording ink from the ink cartridge 200 loaded into the ink cartridge loading section 104, via an ink supply tube (not shown).

Meanwhile, as a paper feeding section for feeding a base 142 loaded on a base loading section (pressurizing plate) 141 of the paper feeding tray 102, there are provided a half-moon roller (paper feeding roller 143) configured to feed the base 142 one by one from the base loading section 141, and a separation pad 144 which faces the paper feeding roller 143 and is formed of a material with a large friction coefficient. This separation pad 144 is biased toward the paper feeding roller 143 side.

As a conveyance section for conveying the base 142, which has been fed from this paper feeding section, under the recording head 134, there are provided a conveyance belt 151 for conveying the base 142 by means of electrostatic adsorption; a counter roller 152 for conveying the base 142, which is sent from the paper feeding section via a guide 145, while the base is sandwiched between the counter roller and the conveyance belt 151; a conveyance guide 153 for making the base 142, which is sent upward in the substantially vertical direction, change its direction by approximately 90° and thus run along the conveyance belt 151; and an end pressurizing roller 155 biased toward the conveyance belt 151 side by a pressing member 154. Also, there is provided a charging roller 156 serving as a charging unit for charging a surface of the conveyance belt 151.

The conveyance belt 151 is an endless belt; and is capable of rotating around in a belt conveyance direction by stretching between a heater type conveyance roller 157 and a tension roller 158. The conveyance belt 151 has, for example, a surface layer serving as a surface for adsorbing a non-porous base, which is formed of a resinous material [e.g., ethylene-tetrafluoroethylene copolymer (ETFE)] having a thickness of approximately 40 μm for which resistance control has not been conducted; and a back layer (intermediate resistance layer, ground layer) which is formed of the same material as the surface layer, and for which resistance control has been conducted using carbon. On the back of the conveyance belt 151, a heater type guide member 161 is placed correspondingly to a region where printing is carried out by the recording head 134. Additionally, as a paper discharge section for discharging the base 142 on which images have been recorded by the recording head 134, there are provided a separation claw 171 for separating the base 142 from the conveyance belt 151, a paper discharge roller 172, and a paper discharge roller 173. The base 142 is subjected to hot-air drying by means of a fan heater 174, followed by being outputted to the paper discharge tray 103 placed below the paper discharge roller 172.

A double-sided paper feeding unit 181 is detachably mounted on a rear surface portion of the device main body 101. The double-sided paper feeding unit 181 takes in the base 142 returned by rotation of the conveyance belt 151 in the opposite direction and reverses it, then refeeds it between the counter roller 152 and the conveyance belt 151. Additionally, a manual paper feeding section 182 is provided on an upper surface of the double-sided paper feeding unit 181.

In the inkjet recording device, the base 142 is fed one by one from the paper feeding section, and the base 142 fed upward in the substantially vertical direction is guided by the guide 145 and conveyed with being sandwiched between the conveyance belt 151 and the counter roller 152. Further, an end of the base is guided by the conveyance guide 153 and pressed onto the conveyance belt 151 by the end pressurizing roller 155, so that the conveyance direction of the base is changed by approximately 90°. On this occasion, the conveyance belt 157 is charged by the charging roller 156, and the base 142 is electrostatically adsorbed onto the conveyance belt 151 and thusly conveyed.

Here, by driving the recording head 134 according to an image signal while moving the carriage 133, ink droplets are ejected onto the base 142 having stopped so as to carry out recording for one line. Thereafter, the base 142 is conveyed by a predetermined distance, and then recording for the next line is carried out. On receipt of a recording completion signal or a signal indicating that a rear end of the base 142 has reached a recording region, recording operation is finished, and the base 142 is discharged onto the paper discharge tray 103.

<Ink Recorded Matter>

An ink recorded matter of the present invention includes a base, and an image which is formed on the base using an inkjet ink of the present invention.

The base is not particularly limited, and may be plain paper, gloss paper, specialty paper, or cloth. In particular, when the inkjet ink of the present invention is applied onto a non-porous base, an image having good glossiness and image fastness can be provided.

Representative examples of the non-porous base include those formed of a plastic material such as a transparent or colored polyvinyl chloride film, polyethylene terephthalate (PET) film, polycarbonate film, acrylic film, polypropylene film, polyimide film, and polystyrene film; and containing no paper component such as wood-pulp paper, Japanese paper, synthetic pulp paper, and synthetic fiber paper. However, the ink of the present invention exhibits satisfactory performance against other non-porous bases and conventional porous medium such as plain paper or inorganic matter-coated porous medium.

EXAMPLES

The present invention will be further specifically described with reference to Examples and Comparative Examples, but is not limited to Examples. Note that, "part(s)" described in Examples and Comparative Examples means "part(s) by mass", and numerical values described in Tables 1-1 to 2 also mean "part(s) by mass."

<Preparation of Polycarbonate Urethane Resin Emulsion A>

A reaction vessel equipped with a stirrer, a reflux condenser, and a thermometer was charged with 1,500 g of polycarbonate diol (reaction product of 1,6-hexanediol and dimethyl carbonate), 220 g of 2,2-dimethylol propionic acid (DMPA), and 1,347 g of N-methylpyrrolidone (NMP) under a nitrogen gas stream, followed by heating to 60° C. to thereby dissolve DMPA.

Thereafter, 1,445 g of 4,4'-dicyclohexylmethane diisocyanate and 2.6 g of dibutyl tin laurate (catalyst) were added thereto, followed by heating to 90° C. to allow to urethanize for 5 hours, to thereby obtain an isocyanate-terminated urethane prepolymer.

Then, the resultant reaction mixture was cooled to 80° C. To this, 149 g of triethylamine was added and mixed together, and 4,340 g out of the resultant mixture was taken out and added to a mixed solution of 5,400 g of water and 15 g of triethylamine with strong stirring.

Then, 1,500 g of ice and 626 g of a 35% by mass solution of 2-methyl-1,5-pentanediamine in water was added thereto to thereby allow for a chain elongation reaction. Solvents were distilled off so as to give a solid content of 30% by mass, to thereby obtain a polycarbonate urethane resin emulsion A having a volume average particle diameter of 25 nm. The volume average particle diameter was measured by means of NANOTRAC WAVE-UT151 (product of NIKKISO CO., LTD.).

This emulsion A was applied onto a glass slide so as to give a film thickness of 10 μm, and dried at 100° C. for 30 min to thereby form a resin film. The resultant resin film was found to have a Martens hardness of 120 N/mm$^2$ as measured by a micro surface hardness meter (FISCHERSCOPE HM2000, product of Fischer Instruments K.K.) at the time when a Vickers indenter is indented with a load of 9.8 mN.

<Preparation of Polycarbonate Urethane Resin Emulsion B>

A polycarbonate urethane resin emulsion B having the volume average particle diameter of 20 nm was obtained in the same manner as in the preparation of polycarbonate urethane resin emulsion A, except that hexamethylene diisocyanate was used instead of 4,4'-dicyclohexylmethane diisocyanate. The volume average particle diameter was measured by means of NANOTRAC WAVE-UT151 (product of NIKKISO CO., LTD.).

The resultant emulsion B was found to have a Martens hardness of 88 N/mm$^2$ as measured for strength of a coating film in the same manner as the emulsion A.

<Preparation of Polycarbonate Urethane Resin Emulsion C>

A polycarbonate urethane resin emulsion C having the volume average particle diameter of 30 nm was obtained in the same manner as in the preparation of polycarbonate urethane resin emulsion A, except that a mixture of isophorone diisocyanate and dodecamethylene diisocyanate (molar ratio 6:4) was used instead of 4,4'-dicyclohexylmethane diisocyanate. The volume average particle diameter was measured by means of NANOTRAC WAVE-UT151 (product of NIKKISO CO., LTD.).

The resultant emulsion C was found to have a Martens hardness of 105 N/mm$^2$ as measured for strength of a coating film in the same manner as the emulsion A.

<Preparation of Pigment Dispersion Liquid 1>

Materials described in the following formulation were premixed together, and then subjected to circulation dispersion for 7 hours by means of a disc type bead mill (model KDL, product of SHINMARU ENTERPRISES CORPORATION, media: zirconia ball having a diameter of 0.3 mm) to thereby obtain a pigment dispersion liquid 1.

<Formulation of Pigment Dispersion Liquid 1>

Carbon black pigment (MITSUBISHI CARBON BLOCK #2300, product of Mitsubishi Chemical Corporation): 15 parts Anionic surfactant (PIONIN A-51-B, product of TAKEMOTO OIL & FAT Co., Ltd.): 2 parts Ion-exchanged water: 83 parts <Preparation of Pigment Dispersion Liquid 2>

A pigment dispersion liquid 2 was produced in the same manner as in the preparation of pigment dispersion liquid 1, except that the carbon black pigment was changed to pigment blue 15:3 (HOSTAJET CYAN BG-PT, product of Clariant International Ltd.).

<Preparation of Pigment Dispersion Liquid 3>

A pigment dispersion liquid 3 was produced in the same manner as in the preparation of pigment dispersion liquid 1, except that the carbon black pigment was changed to pigment red 122 (HOSTAJET MAGENTA E-PT, product of Clariant International Ltd.).

<Preparation of Pigment Dispersion Liquid 4>

A pigment dispersion liquid 4 was produced in the same manner as in the preparation of pigment dispersion liquid 1, except that the carbon black pigment was changed to pigment yellow 74 (Fast Yellow 7413, product of SANYO COLOR WORKS, Ltd.).

Example 1

Materials described in the following ink formulation containing the pigment dispersion liquid 1 was mixed and stirred, and then filtered through a polypropylene filter having an average pore diameter of 0.2 μm, to thereby produce an ink of Example 1.

<Ink Formulation>

Pigment dispersion liquid 1: 20 parts
Polycarbonate urethane resin emulsion A: 15 parts
Surfactant $CH_3(CH_2)_{12}O(CH_2CH_2O)_3CH_2COOH$: 2 parts
Propylene glycol (bp: 188° C.): 20 parts
3-Ethyl-3-hydroxymethyl oxetane (bp: 240° C.): 15 parts
Antiseptic-antifungal agent PROXEL LV (product of Lonza Group AG): 0.1 parts
Ion-exchanged water: 27.9 parts Examples 2 to 19 and Comparative Examples 1 to 10

Each of inks of Examples 2 to 19 and Comparative Examples 1 to 10 was produced in the same manner as in Example 1, except that the ink formulation was changed to formulation described in each of columns in Tables 1-1 to 1-3 (Examples) and Tables 2-1 and 2-2 (Comparative Examples).

Each of the inks was examined for its properties as follows. Results are shown in Tables 3-1 to 4.

<Drying Property>

Each of the inks was charged into an inkjet printer (IPSIO GXE5500, product of Ricoh Company, Ltd.), and a solid image was printed on a gloss coat paper (OK TOP COAT+, product of Oji Paper Co., Ltd.), followed by drying at 25° C. for a predetermined period. A filter paper was pressed against a post-dried solid portion with a load of 1 kg. Each of the inks was evaluated for drying property according to the following criteria based on the degree of transfer of the ink to the filter paper. Note that, the drying property of Rank 3.5 or more was considered to be acceptable.

[Evaluation Criteria]

Rank 5: Transfer to filter paper was not observed after drying at 25° C. for 10 min.
Rank 4: The transfer to filter paper was not observed after drying at 25° C. for 20 min.
Rank 3.5: The transfer to filter paper was not observed after drying at 25° C. for 30 min.
Rank 3: The transfer to filter paper was not observed after drying at 25° C. for 45 min.
Rank 2: The transfer to filter paper was not observed after drying at 25° C. for 60 min.
Rank 1: The transfer to filter paper was observed even after drying at 25° C. for 60 min.

<Image Glossiness>

Each of the inks was charged into an inkjet printer (IPSIO GXE5500, product of Ricoh Company, Ltd.), and a solid image was printed on a PVC film (DGS-210-WH, product of Roland DG Corporation) which is a non-porous base, followed by drying at 80° C. for 1 hour. Then, the 60 degree-glossiness in a solid portion on the solid image was measured by a glossmeter (4501, product of BYK Gardener).

Note that, the 60 degree-glossiness of 80 or more was considered to be acceptable.

<Scratch Resistance>

Each of the inks was charged into an inkjet printer (IPSIO GXE5500, product of Ricoh Company, Ltd.), and a solid image was printed on a PVC film (DGS-210-WH, product of Roland DG Corporation) which is a non-porous base, followed by drying at 80° C. for 1 hour. Then, a solid portion of the solid image was scratched with a dry cotton cloth (KANAKIN No. 3) with a load of 400 g. The number of scratch was recorded at the time when a coating failure was visually observed. The number of scratch of 60 or more was considered to be acceptable.

<Ethanol Resistance>

Each of the inks was charged into an inkjet printer (IPSIO GXE5500, product of Ricoh Company, Ltd.), and a solid image was printed on a PVC film (DGS-210-WH, product of Roland DG Corporation) which is a non-porous base, followed by drying at 80° C. for 1 hour. Then, a solid portion of the solid image was scratched with a cotton swab which had been impregnated with a 50% by mass solution of ethanol in water. The number of scratch was recorded at the time when a coating failure was visually observed. The number of scratch of 30 or more was considered to be acceptable.

<Ejection Stability>

Each of the inks was charged into an inkjet printer (IPSIO GXE5500, product of Ricoh Company, Ltd.) which was provided with a covering unit, and then left to stand for 1 week at a temperature of 30° C. and a humidity of 15% RH with a head being covered. Thereafter, a nozzle check pattern was printed, thus a rate of occurrence (%) of non-ejection or injection disturbance was examined. The rate of occurrence of 10% or less was considered to be acceptable.

<Adhesive Property>

Each of the inks was charged into an inkjet printer (IPSIO GXE5500, product of Ricoh Company, Ltd.), and solid images were printed on three bases: a PVC film (DGS-210-WH, product of Roland DG Corporation), a PP film (P2161, product of TOYOBO CO., LTD.), and a PET film (E5100, product of TOYOBO CO., LTD.), followed by thoroughly drying.

Each of solid portions of the solid images was evaluated for the number of peeled squares out of 100 test squares by a cross-cut peeling test using a cloth adhesive tape (123LW-50, product of Nichiban Co., Ltd.).

Note that, the number of peeled squares of 5 or less out of 100 test squares was considered to be acceptable.

TABLE 1-1

| | \multicolumn{8}{c}{Example} |
|---|---|---|---|---|---|---|---|---|
| | 1 | 2 | 3 | 4 | 5 | 6 | 7 | 8 |
| Black pigment dispersion liquid | 20 | | | | 20 | | | |
| Cyan pigment dispersion liquid | | 20 | | | | 20 | | |
| Magenta pigment dispersion liquid | | | 15 | | | | 15 | |
| Yellow pigment dispersion liquid | | | | 15 | | | | 15 |
| Polycarbonate urethane resin emulsion A (25 nm) | 15 | 15 | 10 | 10 | | | 10 | 15 |
| Polycarbonate urethane resin emulsion B (20 nm) | | | | | 15 | 15 | | |
| Polycarbonate urethane resin emulsion C (30 nm) | | | | | | | | |
| Acrylic resin emulsion VONCOAT R-3380-E (product of DIC Corporation) | | | | 5 | | | | |
| Fluororesin emulsion | | | | | | | | |
| Polyether urethane resin emulsion ACRIT WBR-O16U (product of Taisei Fine Chemical Co., Ltd.) | | | | | | | | |
| Polyester urethane resin emulsion UCOAT UWS-148 (product of Sanyo Chemical Industries, Ltd.) | | | | | | | | |
| Surfactant $CH_3(CH_2)_{12}O(CH_2CH_2O)_3CH_2COOH$ | 2 | 2 | 2 | 2 | 2 | 2 | 2 | 2 |
| Silicone surfactant KF-351A (product of Shin-Etsu Chemical Co., Ltd.) | | | | | | | | |
| Propylene glycol (b.p. 188° C.) | 20 | | 15 | | 20 | | | |
| 2,3-Butanediol (b.p. 183° C.) | | 20 | | 25 | | 20 | | |
| 1,2-Butanediol (b.p. 194° C.) | | | 10 | | | | 25 | |
| 2-Methyl-2,4-pentanediol (b.p. 198° C.) | | | | | | | | 25 |
| 1,3-Propanediol (b.p. 214° C.) | | | | | | 10 | | |
| Triethylene glycol (b.p. 287° C.) | | | | | | | | |
| 3-Ethyl-3-hydroxymethyl oxetane (b.p. 240° C.) | 15 | | | | | | | |
| Tripropylene glycol monomethyl ether (b.p. 241° C.) | | 15 | | | | | | |
| 1-Ethyl-2-pyrrolidone (b.p. 218° C.) | | | 15 | | | | | |
| N-mehyl-2-pyrrolidone (b.p. 204° C.) | | | | 15 | | | | |
| Diethylene glycol-n-butylether (b.p. 230° C.) | | | | | 15 | | 15 | 15 |
| Ethylene glycol-n-hexyl ether (b.p. 208° C.) | | | | | | 10 | | |
| Tripropylene glycol-n-propyl ether (b.p. 261° C.) | | | | | | | | |
| Diethylene glycol methyl ether (b.p. 194° C.) | | | | | | | | |
| PROXEL LV (product of Lonza Group AG) | 0.1 | 0.1 | 0.1 | 0.1 | 0.1 | 0.1 | 0.1 | 0.1 |
| Ion-exchanged water | 27.9 | 27.9 | 32.9 | 27.9 | 27.9 | 22.9 | 32.9 | 27.9 |
| Total amount | 100 | 100 | 100 | 100 | 100 | 100 | 100 | 100 |

TABLE 1-2

| | \multicolumn{7}{c}{Example} |
|---|---|---|---|---|---|---|---|
| | 9 | 10 | 11 | 12 | 13 | 14 | 15 | 16 |
| Black pigment dispersion liquid | 20 | | 20 | | | 20 | | |
| Cyan pigment dispersion liquid | | 15 | | 15 | | | | 20 |
| Magenta pigment dispersion liquid | | | | | 15 | | | |
| Yellow pigment dispersion liquid | | | | | | 20 | | |
| Polycarbonate urethane resin emulsion A (25 nm) | 15 | 15 | | 15 | 15 | 15 | 15 | 15 |
| Polycarbonate urethane resin emulsion B (20 nm) | | | | | | | | |
| Polycarbonate urethane resin emulsion C (30 nm) | | | 15 | | | | | |
| Acrylic resin emulsion VONCOAT R-3380-E (product of DIC Corporation) | | | | | | | | |
| Fluororesin emulsion | | | | | | | | |
| Polyether urethane resin emulsion ACRIT WBR-O16U (product of Taisei | | | | | | | | |

TABLE 1-2-continued

| | Example | | | | | | | |
|---|---|---|---|---|---|---|---|---|
| | 9 | 10 | 11 | 12 | 13 | 14 | 15 | 16 |
| Fine Chemical Co., Ltd.) | | | | | | | | |
| Polyester urethane resin emulsion UCOAT UWS-148 (product of Sanyo Chemical Industries, Ltd.) | | | | | | | | |
| Surfactant $CH_3(CH_2)_{12}O(CH_2CH_2O)_3CH_2COOH$ | 2 | 2 | 2 | 2 | 2 | 2 | 2 | 2 |
| Silicone surfactant KF-351A (product of Shin-Etsu Chemical Co., Ltd.) | | | | | | | | |
| Propylene glycol (b.p. 188° C.) | 20 | | 20 | 20 | 20 | 8 | 8 | |
| 2,3-Butanediol (b.p. 183° C.) | | 20 | | | | | | |
| 1,2-Butanediol (b.p. 194° C.) | | | | | | | | |
| 2-Methyl-2,4-pentanediol (b.p. 198° C.) | | | | | | | | |
| 1,3-Propanediol (b.p. 214° C.) | | | | 20 | | 8 | 8 | 20 |
| Triethylene glycol (b.p. 287° C.) | | 10 | | | | | | |
| 3-Ethyl-3-hydroxymethyl oxetane (b.p. 240° C.) | | | | | | | | |
| Tripropylene glycol monomethyl ether (b.p. 241° C.) | | | | | | | | |
| 1-Ethyl-2-pyrrolidone (b.p. 218° C.) | | | | | | | | |
| N-mehyl-2-pyrrolidone (b.p. 204° C.) | | | | | | | | |
| Diethylene glycol-n-butylether (b.p. 230° C.) | | | 15 | | | 8 | | |
| Ethylene glycol-n-hexyl ether (b.p. 208° C.) | | 10 | | | | | | |
| Tripropylene glycol-n-propyl ether (b.p. 261° C.) | 15 | | | | | | | |
| Diethylene glycol methyl ether (b.p. 194° C.) | | | | | 20 | 8 | 16 | 20 |
| PROXEL LV (product of Lonza Group AG) | 0.1 | 0.1 | 0.1 | 0.1 | 0.1 | 0.1 | 0.1 | 0.1 |
| Ion-exchanged water | 27.9 | 27.9 | 27.9 | 27.9 | 27.9 | 30.9 | 30.9 | 22.9 |
| Total amount | 100 | 100 | 100 | 100 | 100 | 100 | 100 | 100 |

TABLE 1-3

| | Example | | |
|---|---|---|---|
| | 17 | 18 | 19 |
| Black pigment dispersion liquid | 20 | | 20 |
| Cyan pigment dispersion liquid | | 15 | |
| Magenta pigment dispersion liquid | | | |
| Yellow pigment dispersion liquid | | | |
| Polycarbonate urethane resin emulsion A (25 nm) | 15 | 15 | |
| Polycarbonate urethane resin emulsion B (20 nm) | | | |
| Polycarbonate urethane resin emulsion C (30 nm) | | | 15 |
| Acrylic resin emulsion VONCOAT R-3380-E (product of DIC Corporation) | | | |
| Fluororesin emulsion | | | |
| Polyether urethane resin emulsion ACRIT WBR-O16U (product of Taisei Fine Chemical Co., Ltd.) | | | |
| Polyester urethane resin emulsion UCOAT UWS-148 (product of Sanyo Chemical Industries, Ltd.) | | | |
| Surfactant $CH_3(CH_2)_{12}O(CH_2CH_2O)_3CH_2COOH$ | | | |
| Silicone surfactant KF-351A (product of Shin-Etsu Chemical Co., Ltd.) | 2 | 1 | 4 |
| Propylene glycol (b.p. 188° C.) | 20 | | 20 |
| 2,3-Butanediol (b.p. 183° C.) | | 20 | |
| 1,2-Butanediol (b.p. 194° C.) | | | |
| 2-Methyl-2,4-pentanediol (b.p. 198° C.) | | | |
| 1,3-Propanediol (b.p. 214° C.) | | | |
| Triethylene glycol (b.p. 287° C.) | | 10 | |
| 3-Ethyl-3-hydroxymethyl oxetane (b.p. 240° C.) | 15 | 10 | 15 |
| Tripropylene glycol monomethyl ether (b.p. 241° C.) | | | |
| 1-Ethyl-2-pyrrolidone (b.p. 218° C.) | | | |
| N-mehyl-2-pyrrolidone (b.p. 204° C.) | | | |
| Diethylene glycol-n-butyl ether (b.p. 230° C.) | | | |
| Ethylene glycol-n-hexyl ether (b.p. 208° C.) | | | |
| Tripropylene glycol-n-propyl ether (b.p. 261° C.) | | | |
| Diethylene glycol methyl ether (b.p. 194° C.) | | | |
| PROXEL LV (product of Lonza Group AG) | 0.1 | 0.1 | 0.1 |
| Ion-exchanged water | 27.9 | 28.9 | 25.9 |
| Total amount | 100 | 100 | 100 |

TABLE 2-1

| | Comparative Example | | | | | | | |
|---|---|---|---|---|---|---|---|---|
| | 1 | 2 | 3 | 4 | 5 | 6 | 7 | 8 |
| Black pigment dispersion liquid | 20 | | 20 | | | | | |
| Cyan pigment dispersion liquid | | 20 | | 20 | | | | |
| Magenta pigment dispersion liquid | | | | | 15 | | 15 | |
| Yellow pigment dispersion liquid | | | | | | 15 | | 15 |
| Polycarbonate urethane resin | 15 | | | | | | 10 | 15 |

TABLE 2-1-continued

| | Comparative Example | | | | | | | |
|---|---|---|---|---|---|---|---|---|
| | 1 | 2 | 3 | 4 | 5 | 6 | 7 | 8 |
| emulsion A (25 nm) Polycarbonate urethane resin | | | | | | | | |
| emulsion B (20 nm) Polycarbonate urethane resin | | | | | | | | |
| emulsion C (30 nm) Polycarbonate urethane resin | | | | | | | | |
| Acrylic resin emulsion VONCOAT R-3380-E (product of DIC Corporation) | | | | | | 15 | | |
| Fluororesin emulsion | | | | | 10 | | | |
| Polyether urethane resin emulsion ACRIT WBR-O16U (product of Taisei Fine Chemical Co., Ltd.) | | 15 | | | | | | |
| Polyester urethane resin emulsion UCOAT UWS-148 (product of Sanyo Chemical Industries, Ltd.) | | | | 15 | | | | |
| Surfactant CH$_3$(CH$_2$)$_{12}$O(CH$_2$CH$_2$O)$_3$CH$_2$COOH | 2 | 2 | 2 | 2 | 2 | 2 | 2 | 2 |
| Silicone surfactant KF-351A (product of Shin-Etsu Chemical Co., Ltd.) | | | | | | | | |
| Propylene glycol (b.p. 188° C.) | 17 | | 20 | | 15 | | | |
| 2,3-Butanediol (b.p. 183° C.) | | 20 | | 20 | | 25 | | |
| 1,2-Butanediol (b.p. 194° C.) | | | | | 10 | | | |
| 2-Methyl-2,4-pentanediol (b.p. 198° C.) | | | | | | | | 10 |
| 1,3-Propanediol (b.p. 214° C.) | | | | | | | | |
| Triethylene glycol (b.p. 287° C.) | | | | | | | | |
| 3-Ethyl-3-hydroxymethyl oxetane (b.p. 240° C.) | | | | | | | | |
| Tripropylene glycol monomethyl ether (b.p. 241° C.) | | | | | | | | |
| 1-Ethyl-2-pyrrolidone (b.p. 218° C.) | | | | | | | | |
| N-mehyl-2-pyrrolidone (b.p. 204° C.) | | | | | | | | |
| Diethylene glycol-n-butylether (b.p. 230° C.) | 20 | | 15 | | 15 | 15 | | 30 |
| Ethylene glycol-n-hexyl ether (b.p. 208° C.) | | 15 | | 15 | | | | |
| Tripropylene glycol-n-propyl ether (b.p. 261° C.) | | | | | | | | |
| Diethylene glycol methyl ether (b.p. 194° C.) | | | | | | | 40 | |
| PROXEL LV (product of Lonza Group AG) | 0.1 | 0.1 | 0.1 | 0.1 | 0.1 | 0.1 | 0.1 | 0.1 |
| Ion-exchanged water | 25.9 | 42.9 | 27.9 | 27.9 | 32.9 | 27.9 | 32.9 | 27.9 |
| Total amount | 100 | 100 | 100 | 100 | 100 | 100 | 100 | 100 |

TABLE 2-2

| | Comparative Example | |
|---|---|---|
| | 9 | 10 |
| Black pigment dispersion liquid | 20 | |
| Cyan pigment dispersion liquid | | 20 |
| Magenta pigment dispersion liquid | | |
| Yellow pigment dispersion liquid | | |
| Polycarbonate urethane resin emulsion A (25 nm) | 15 | 15 |
| Polycarbonate urethane resin emulsion B (20 nm) | | |
| Polycarbonate urethane resin emulsion C (30 nm) | | |
| Acrylic resin emulsion VONCOAT R-3380-E (product of DIC Corporation) | | |
| Fluororesin emulsion | | |
| Polyether urethane resin emulsion ACRIT WBR-O16U (product of Taisei Fine Chemical Co., Ltd.) | | |
| Polyester urethane resin emulsion UCOAT UWS-148 (product of Sanyo Chemical Industries, Ltd.) | | |
| Surfactant CH$_3$(CH$_2$)$_{12}$O(CH$_2$CH$_2$O)$_3$CH$_2$COOH | 2 | 2 |
| Silicone surfactant KF-351A (product of Shin-Etsu Chemical Co., Ltd.) | | |
| Propylene glycol (b.p. 188° C.) | | |
| 2,3-Butanediol (b.p. 183° C.) | | |
| 1,2-Butanediol (b.p. 194° C.) | | |
| 2-Methyl-2,4-pentanediol (b.p. 198° C.) | | |
| 1,3-Propanediol (b.p. 214° C.) | 20 | 15 |
| Triethylene glycol (b.p. 287° C.) | | |
| 3-Ethyl-3-hydroxymethyl oxetane (b.p. 240° C.) | | |
| Tripropylene glycol monomethyl ether (b.p. 241° C.) | | |
| 1-Ethyl-2-pyrrolidone (b.p. 218° C.) | | |
| N-mehyl-2-pyrrolidone (b.p. 204° C.) | | |
| Diethylene glycol-n-butylether (b.p. 230° C.) | | |
| Ethylene glycol-n-hexyl ether (b.p. 208° C.) | | |
| Tripropylene glycol-n-propyl ether (b.p. 261° C.) | | |
| Diethylene glycol methyl ether (b.p. 194° C.) | 15 | 20 |
| PROXEL LV (product of Lonza Group AG) | 0.1 | 0.1 |
| Ion-exchanged water | 27.9 | 27.9 |
| Total amount | 100 | 100 |

TABLE 3-1

| | Example | | | | | | | | | |
|---|---|---|---|---|---|---|---|---|---|---|
| | 1 | 2 | 3 | 4 | 5 | 6 | 7 | 8 | 9 | 10 |
| Drying property | 5 | 5 | 5 | 4 | 3.5 | 3.5 | 3.5 | 3.5 | 3.5 | 3.5 |
| Image glossiness | 92 | 91 | 92 | 92 | 89 | 87 | 87 | 86 | 87 | 87 |
| Scratch resistance | 110 | 120 | 120 | 120 | 60 | 65 | 85 | 80 | 70 | 65 |
| Ethanol resistance | 60 | 55 | 60 | 55 | 35 | 30 | 35 | 40 | 40 | 35 |
| Ejection stability (%) | 0 | 0 | 1 | 2 | 1 | 3 | 9 | 8 | 4 | 4 |
| Adhesive property  PVC film | 0 | 0 | 0 | 0 | 0 | 0 | 0 | 0 | 0 | 0 |
| PP film | 0 | 0 | 0 | 0 | 5 | 4 | 3 | 1 | 0 | 2 |
| PET film | 0 | 0 | 0 | 0 | 4 | 3 | 1 | 0 | 0 | 1 |

TABLE 3-2

| | Example | | | | | | | | |
|---|---|---|---|---|---|---|---|---|---|
| | 11 | 12 | 13 | 14 | 15 | 16 | 17 | 18 | 19 |
| Drying property | 3.5 | 3.5 | 4 | 3.5 | 3.5 | 3.5 | 5 | 3.5 | 3.5 |
| Image glossiness | 89 | 91 | 86 | 87 | 90 | 86 | 92 | 90 | 88 |
| Scratch resistance | 65 | 60 | 100 | 80 | 85 | 75 | 110 | 100 | 90 |
| Ethanol resistance | 30 | 35 | 45 | 40 | 45 | 40 | 60 | 55 | 50 |
| Ejection stability (%) | 4 | 2 | 1 | 7 | 8 | 7 | 0 | 4 | 4 |
| Adhesive property  PVC film | 0 | 0 | 0 | 0 | 0 | 0 | 0 | 0 | 0 |
| PP film | 0 | 1 | 2 | 1 | 0 | 3 | 0 | 0 | 0 |
| PET film | 0 | 1 | 1 | 0 | 0 | 2 | 0 | 0 | 0 |

TABLE 4

| | Comparative Example | | | | | | | | | |
|---|---|---|---|---|---|---|---|---|---|---|
| | 1 | 2 | 3 | 4 | 5 | 6 | 7 | 8 | 9 | 10 |
| Drying property | 3 | 4 | 4 | 4 | 4 | 4 | 3 | 2 | 3 | 4 |
| Image glossiness | 36 | 11 | 68 | 74 | 19 | 76 | 28 | 13 | 75 | 34 |
| Scratch resistance | 55 | 5 | 50 | 55 | 25 | 65 | 50 | 45 | 50 | 45 |
| Ethanol resistance | 40 | 5 | 25 | 30 | 10 | 5 | 45 | 20 | 25 | 30 |
| Ejection stability (%) | 35 | 0 | 1 | 1 | 1 | 1 | 55 | 45 | 6 | 40 |
| Adhesive property  PVC film | 55 | 100 | 100 | 100 | 100 | 100 | 70 | 60 | 55 | 60 |
| PP film | 70 | 100 | 100 | 100 | 100 | 100 | 85 | 80 | 75 | 80 |
| PET film | 60 | 100 | 100 | 100 | 100 | 100 | 85 | 65 | 65 | 65 |

As can be seen from Tables 3-1 to 4, an aqueous inkjet ink which contains polycarbonate urethane resin particles, in which 50% by mass or more of the water-soluble organic solvent is a diol compound, and in which 50% by mass or more of the water-soluble organic solvent is a water-soluble organic solvent having a boiling point of 200° C. or less has high drying property, and excellent image quality, scratch resistance, ethanol resistance, ejection stability, and adhesive property.

As shown in Examples 1 to 6 and 9 to 13, inclusion of at least one of propylene glycol and 2,3-butanediol in a large amount achieves excellent ejection reliability. In addition, as shown in Examples 1 to 4, inclusion of at least one selected from 3-ethyl-3-hydroxymethyl oxetane, tripropylene glycol monomethyl ether, and a water-soluble organic solvent containing a lactam structure and having a boiling point of 200° C. or more achieves, in particular, excellent scratch resistance and ethanol resistance.

As shown in Examples 1 to 4, 7 to 10, and 12 to 16, inclusion of polycarbonate urethane resin particles having a structure derived from an alicyclic diisocyanate achieves, in particular, excellent scratch resistance and ethanol resistance.

As shown in Examples 17 to 19, inclusion of a silicone surfactant achieves, in particular, excellent image glossiness while retaining good adhesive property.

Embodiments of the present invention are as follows.
<1> An inkjet ink, containing:
  water;
  a water-soluble organic solvent;
  a pigment; and
  polycarbonate urethane resin particles,
  wherein the water-soluble organic solvent contains 50% by mass or more of a diol compound, and
  wherein the water-soluble organic solvent contains 50% by mass or more of a water-soluble organic solvent having a boiling point of 200° C. or less.
<2> The inkjet ink according to <1>, wherein the water-soluble organic solvent having a boiling point of 200° C. or less is at least one selected from the group consisting of propylene glycol and 2,3-butanediol.
<3> The inkjet ink according to <1> or <2>, wherein the water-soluble organic solvent is at least one selected from the group consisting of 3-ethyl-3-hydroxymethyl oxetane, tripropylene glycol monomethyl ether, and a water-soluble organic solvent containing a lactam structure and having a boiling point of 200° C. or more.
<4> The inkjet ink according to <3>, wherein the water-soluble organic solvent containing the lactam structure is 1-ethyl-2-pyrrolidone.
<5> The inkjet ink according to any one of <1> to <4>, wherein the water-soluble organic solvent consists of a solvent having a boiling point of 250° C. or less.
<6> The inkjet ink according to any one of <1> to <5>, wherein each of the polycarbonate urethane resin particles has a structure derived from at least one alicyclic diisocyanate.
<7> The inkjet ink according to any one of <1> to <6>, wherein each of the polycarbonate urethane resin particles has a surface hardness of 100 N/mm$^2$ or more at a time when a coating film is formed.
<8> The inkjet ink according to any one of <1> to <3> and <5> to <7>, wherein the inkjet ink further contains a silicone surfactant.

<9> An inkjet recording method, including:
applying a stimulus to the inkjet ink according to any one of <1> to <8> to allow the inkjet ink to jet to thereby record an image on a base.

<10> The inkjet recording method according to <9>, wherein the inkjet recording method further includes heat-drying the image after being recorded.

<11> The inkjet recording method according to <9> or <10>, wherein the base is a non-porous base.

<12> An ink recorded matter, including:
a base, and
an image which is formed on the base with the inkjet ink according to any one of <1> to <8>.

<13> The ink recorded matter according to <12>, wherein the base is a non-porous base.

<14> An inkjet recording device, including:
an ink jetting unit configured to apply a stimulus to the inkjet ink according to any one of <1> to <8> to allow the inkjet ink to jet, to thereby record an image on a base.

<15> The inkjet recording device according to <14>, wherein the inkjet recording device further includes a heating unit configured to heat-dry the image after being recorded.

<16> An ink cartridge, including:
a container, and
the inkjet ink according to any one of <1> to <8> contained in the container.

REFERENCE SIGNS LIST

101 Device Main Body
102 Paper Feeding Tray
103 Paper Discharging Tray
104 Ink Cartridge Loading Section
105 Control Section
111 Head Cover
112 Front Surface
115 Front Cover
131 Guide Rod
132 Stay
133 Carriage
134 Recording Head
135 Sub-Tank
141 Paper Loading Section
142 Base
143 Paper Feeding Roller
144 Separation Pad
145 Guide
151 Conveyance Belt
152 Counter Roller
153 Conveyance Guide
154 Pressing Member
155 Pressurizing Roller
156 Charging Roller
157 Conveyance Roller
158 Tension Roller
161 Guide Member
171 Separation Claw
172 Paper Discharge Roller
173 Paper Discharge Roller
181 Double-Sided Paper Feeding Unit
182 Manual Paper Feeding Section

The invention claimed is:

1. An inkjet ink, comprising:
water;
a water-soluble organic solvent;
a pigment; and
polycarbonate urethane resin particles,
wherein:
the water-soluble organic solvent comprises 50% by mass or more of a diol compound;
the water-soluble organic solvent comprises 50% by mass or more of a water-soluble organic solvent having a boiling point of 200° C. or less,
wherein the water-soluble organic solvent having a boiling point of 200° C. or less comprises propylene glycol, wherein an amount of propylene glycol added to the ink is 15% by mass of the inkjet ink to 20% by mass of the inkjet ink, and
the water-soluble organic solvent comprises 3-ethyl-3-hydroxymethyl oxetane.

2. The inkjet ink according to claim 1, wherein the water-soluble organic solvent having a boiling point of 200° C. or less further comprises 2,3-butanediol.

3. The inkjet ink according to claim 1, wherein the water-soluble organic solvent comprises 1-ethyl-2-pyrrolidone.

4. The inkjet ink according to claim 1, wherein the water-soluble organic solvent does not comprise a solvent having a boiling point of more than 250° C.

5. The inkjet ink according to claim 1, wherein each of the polycarbonate urethane resin particles has a structure derived from at least one alicyclic diisocyanate.

6. The inkjet ink according to claim 1, wherein each of the polycarbonate urethane resin particles has a surface hardness of 100 N/mm$^2$ or more at a time when a coating film is formed.

7. The inkjet ink according to claim 1, wherein the inkjet ink further comprises a silicone surfactant.

8. An inkjet recording method, comprising applying a stimulus to an inkjet ink to allow the inkjet ink to jet to thereby record an image on a base,
wherein the inkjet ink comprises:
water;
a water-soluble organic solvent;
a pigment; and
polycarbonate urethane resin particles,
and wherein:
the water-soluble organic solvent comprises 50% by mass or more of a diol compound;
the water-soluble organic solvent comprises 50% by mass or more of a water-soluble organic solvent having a boiling point of 200° C. or less,
wherein the water-soluble organic solvent having a boiling point of 200° C. or less comprises propylene glycol, wherein an amount of propylene glycol added to the ink is 15% by mass of the inkjet ink to 20% by mass of the inkjet ink, and
the water-soluble organic solvent comprises 3 ethyl-3-hydroxymethyl oxetane.

9. The inkjet recording method according to claim 8, wherein the inkjet recording method further comprises heat-drying the image after being recorded.

10. The inkjet recording method according to claim 8, wherein the base is a non-porous base.

11. An ink recorded matter, comprising:
a base wherein the base is a non-porous base; and
an image which is formed on the base with an inkjet ink comprising:
water;
a water-soluble organic solvent;
a pigment; and
polycarbonate urethane resin particles, wherein:
the water-soluble organic solvent comprises 50% by mass or more of a diol compound;
the water-soluble organic solvent comprises 50% by mass or more of a water-soluble organic solvent having a boiling point of 200° C. or less,
   wherein the water-soluble organic solvent having a boiling point of 200° C. or less comprises propylene glycol, wherein an amount of propylene glycol added to the ink is 15% by mass of the inkjet ink to 20% by mass of the inkjet ink, and
the water-soluble organic solvent comprises 3 ethyl-3-hydroxymethyl oxetane.

* * * * *